United States Patent
Boursier

(10) Patent No.: US 8,439,186 B2
(45) Date of Patent: May 14, 2013

(54) ENDLESS CARRIER BELT FOR CONVEYOR SYSTEM AND CONVEYOR SYSTEM FITTED THEREWITH

(75) Inventor: Marcel Boursier, Saint-Colomban (FR)

(73) Assignee: LIFTVRAC, Saint-Colomban (FR)

( * ) Notice: Subject to any disclaimer, the term of this patent is extended or adjusted under 35 U.S.C. 154(b) by 18 days.

(21) Appl. No.: 13/054,258

(22) PCT Filed: Jul. 16, 2009

(86) PCT No.: PCT/FR2009/051411
§ 371 (c)(1),
(2), (4) Date: Jan. 14, 2011

(87) PCT Pub. No.: WO2010/007320
PCT Pub. Date: Jan. 21, 2010

(65) Prior Publication Data
US 2011/0114455 A1    May 19, 2011

(30) Foreign Application Priority Data
Jul. 18, 2008   (FR) ...................................... 08 04101

(51) Int. Cl.
*B65G 15/08* (2006.01)
(52) U.S. Cl.
USPC .......................................... 198/819; 198/847
(58) Field of Classification Search .................. 198/819, 198/820, 821, 847
See application file for complete search history.

(56) References Cited

U.S. PATENT DOCUMENTS

| | | | | |
|---|---|---|---|---|
| 2,013,242 A | * | 9/1935 | Johns | 198/626.3 |
| 2,061,838 A | * | 11/1936 | Johns | 198/821 |
| 2,108,488 A | * | 2/1938 | Johns | 198/626.3 |
| 2,199,935 A | * | 5/1940 | Johns | 198/819 |
| 2,212,024 A | * | 8/1940 | Johns | 198/819 |
| 3,326,354 A | * | 6/1967 | Aydelott | 198/819 |
| 3,338,383 A | * | 8/1967 | Hashimoto | 198/819 |
| 6,484,872 B1 | * | 11/2002 | Jepsen et al. | 198/847 |
| 7,681,717 B2 | * | 3/2010 | DeGroot | 198/832 |
| 2010/0147656 A1 | * | 6/2010 | Honeycutt et al. | 198/824 |

FOREIGN PATENT DOCUMENTS

| | | |
|---|---|---|
| EP | 0630832 A1 | 12/1994 |
| FR | 2531934 A1 | 2/1984 |
| GB | 461162 A | 2/1937 |
| GB | 473117 A | 10/1937 |
| WO | 2004037689 A1 | 5/2004 |

OTHER PUBLICATIONS

International Search Report, dated Nov. 19, 2009, from corresponding PCT application.

* cited by examiner

*Primary Examiner* — Gene Crawford
*Assistant Examiner* — Keith R Campbell
(74) *Attorney, Agent, or Firm* — Young & Thompson

(57) ABSTRACT

An endless carrier belt for a conveyor system, which carrier belt is produced flat from a flexible material, includes a flat body of width L, of central longitudinal plane X and of thickness e, whose top face is designed to support a product to be carried. The flat body contains in its thickness a plurality of longitudinal reinforcing members located in only two regions of the width of the flat body, situated at about a quarter of the way across the width, on each side of the central plane. When formed into a tube, the reinforcing members can be positioned on the horizontal diameter of the cross section of the tube, thus limiting the internal stresses on the structure, especially when the structure is following non-straight paths (corners or curves) in a plane perpendicular to the axes of the endmost rollers of the conveyor on which it is used.

9 Claims, 2 Drawing Sheets

ENDLESS CARRIER BELT FOR CONVEYOR SYSTEM AND CONVEYOR SYSTEM FITTED THEREWITH

BACKGROUND OF THE INVENTION

1. Field of the Invention

The present invention relates to the general field of installations for conveying products with an endless carrier belt. More particularly, it relates to the endless carrier belts made in a flat form from a flexible material and that integrate longitudinal reinforcing members (cables, flat straps . . . ) adapted to restrict the longitudinal extension possibilities thereof.

2. Description of Related Art

In such flat endless carrier belts currently available in the market, the integrated longitudinal reinforcing members are generally distributed in a homogeneous or relatively homogeneous way over the width of the flat belt body (see for example EP-0 630 832).

However, such endless belt structures do not suit for certain conveying installation configurations, in particular in the case where the belt, which is originally flat, is shaped into a trough or a tube over a portion of the installation and is submitted over this portion, in a plane perpendicular to the axes of the end transmission rolls, to a non-rectilinear path (with corners or curves).

BRIEF SUMMARY OF THE INVENTION

To remedy this drawback, the present invention proposes to place the longitudinal reinforcing members only in two areas of the width of the flat belt body, said areas being located at ¼ or approximately ¼ of said band width, on either side of the central plane of said flat belt body.

The extension capabilities of such an endless belt are restricted by the presence of the reinforcing members; and, when this belt is positioned in a tubular or substantially tubular configuration, the reinforcing members can be located in the central plane of the tube which is parallel to the axis of displacement, if the central axis of the belt is maintained in the vertical central plane of the tube, which permits to restrict the internal stresses when this tubular structure moves along non-rectilinear paths, in particular in a plane that is perpendicular to the axes of the end transmission rolls.

Preferably, the carrier belt according to the invention comprises two groups of a plurality of parallel longitudinal reinforcing members, positioned in the two above-mentioned areas of the flat body belt width. Each group advantageously comprises between two and six reinforcing members.

Still preferably, the longitudinal reinforcing members are embedded in the mass of the flat body, each at the neutral fibre of this flat body, i.e. approximately in the middle of its thickness.

According to another characteristic, the carrier belt comprises protruding single-piece studs, regularly distributed over the bottom face thereof and arranged in parallel rows of two couples, the studs of each couple being separated from each other by an area A of the flat body centred on the quarter of its width, on either side of its central plane.

Within this framework, the reinforcing members or groups of reinforcing members are advantageously positioned in the area A of the flat body and centred on this area A.

The invention also relates to an endless belt conveyor comprising:

an endless carrier belt as defined above, two end transmission structures, one of which is motorized, and on both of which said endless carrier belt is rolled in a flat configuration, at least said motorized transmission structure comprising driving elements that cooperate with the single-piece studs provided on the bottom face of said carrier belt, in order to drive the latter, and means for shaping the upper strand of said carrier belt into a tubular or substantially tubular transverse configuration, with the longitudinal edges raised up and coming side by side or practically side by side with each other, the two longitudinal reinforcing members or groups of longitudinal reinforcing members of said carrier band being then positioned on the horizontal diameter of the cross section of said tubular structure obtained, or substantially on this horizontal diameter.

The means for shaping the endless belt into a tubular or substantially tubular transverse configuration are advantageously comprised, at least in part, of longitudinal guiding members (threads, rails, profiles . . . ) against which rests the lower face of the carrier belt upper strand, said guiding members cooperating with the driving studs provided on the bottom face of said carrier belt, to avoid the lateral displacement of the latter.

BRIEF DESCRIPTION OF THE SEVERAL VIEWS OF THE DRAWINGS

The invention will be further described, without thereby being limited, by the following description of a particular embodiment, given only by way of example and shown in the appended drawings, in which.

DETAILED DESCRIPTION OF THE INVENTION

Figure 1:
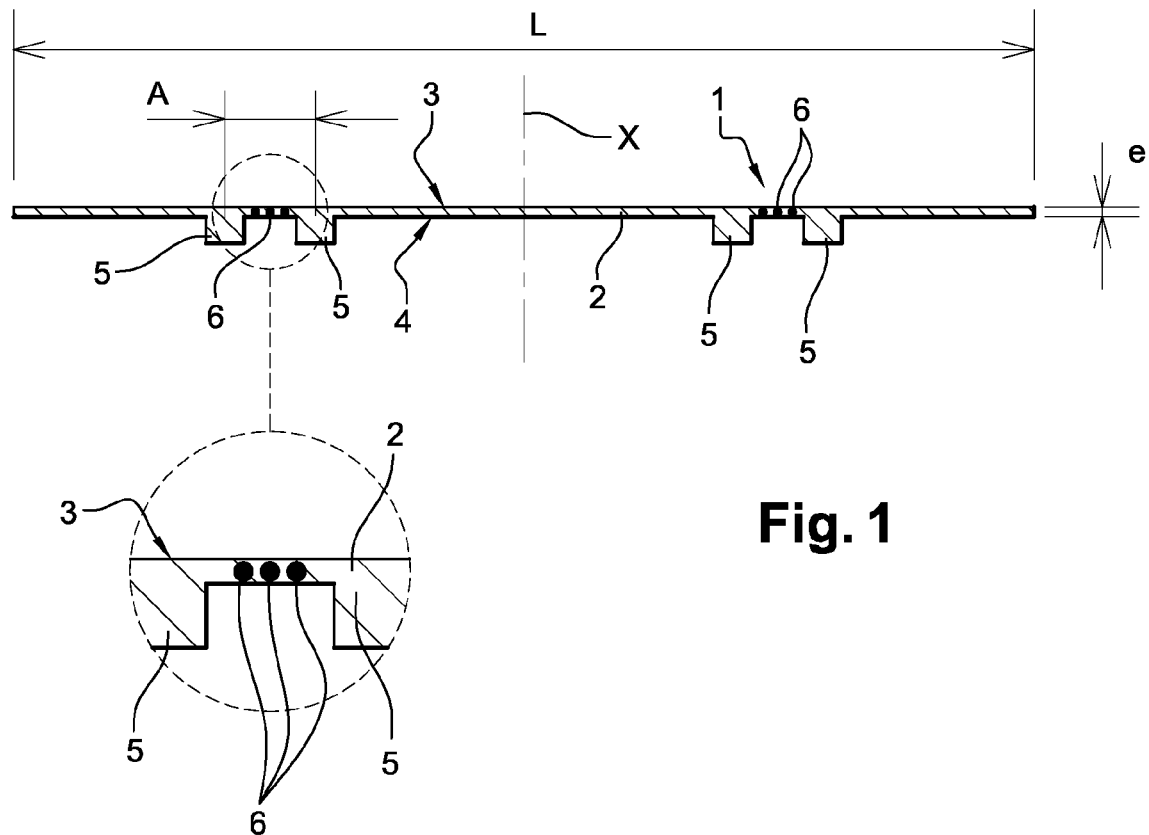
FIG. 1 is a cross sectional view of a carrier belt according to the invention, shown in a flat configuration.

The carrier belt 1, illustrated in cross section in FIG. 1, comprises a flat body 2 made of a flexible plastic material, for example a polyurethane-type elastomer. It is made in a flat form by an extrusion moulding technic.

The flat body 2 has a width L comprised between a few centimeters and a few tens of centimeters. Its thickness e is of the order of a few millimeters and it is symmetrical with respect to its longitudinal central axis X.

The bottom face 3 of the plane body 2, that is intended to receive the products to be carried, is smooth, without protrusion.

Its lower face 4 comprises single-piece studs 5 that are adapted to cooperate with at least one associated transmission structure, within the conveying installation, to drive the carrier belt 1.

The single-piece studs 5 are herein arranged in transversal lines regularly spaced apart, for example by a few centimeters. As illustrated in FIG. 1, they are four of them on each line, and are positioned two by two symmetrically with respect to the central axis X of the flat body 2.

Each couple of studs 5 is approximately centred on the half-width of the belt. Within each couple, the single-piece studs 5 are spaced apart by a distance A.

The carrier belt 1 also comprises longitudinal reinforcing members 6, in the form of cables or flat straps, adapted to restrict the longitudinal extension possibilities thereof.

The reinforcing members 6, made for example of aramid fibre or steel wire, are integrated in the mass during the manufacturing of the belt 1, at the middle of its thickness e, i.e. on the neutral fibre of the flat body 2.

According to the present invention, the reinforcing members 6 are positioned in two areas of the width L of the flat body 2 that are located at the quarter or approximately the quarter of the width L, on either side of the central plane X (i.e. approximately centred on the half-width of the flat body 2).

One reinforcing member 6 can be present in each corresponding area (in the form of a cable or a flat strap). Preferably, especially if cables are used, two groups of a plurality of reinforcing members 6 (advantageously between two and six members by group) are provided.

The groups of reinforcing members 6 are each positioned in a narrow area of width of the flat body 2, for example in a 2-5 mm wide area.

In the embodiment illustrated in FIG. 1, the groups of reinforcing members 6 are positioned in the area A of the flat body 2, between the couples of studs 5, and centred on this area A.

Herein, they consist in cables, three of them in each group. The cables in question advantageously consist in aramid fibre cables having a cross-sectional diameter comprised between 0.5 and 1.5 mm.

Figure 2:
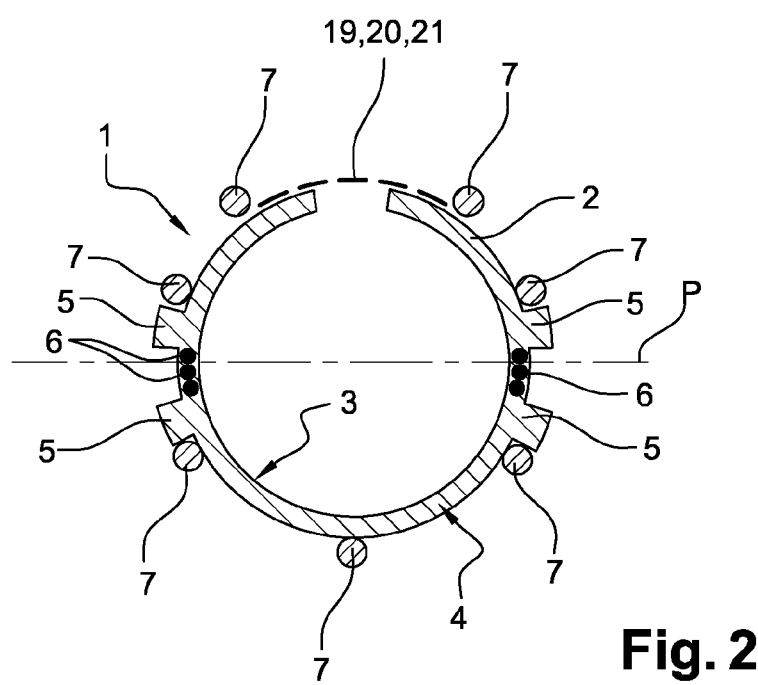
FIG. 2 shows the endless belt of FIG. 1 placed in a practically tubular configuration.

Such carrier belt structure 1 is naturally in a flat state but, due to its transversal flexibility, it can be shaped into a trough or, in a more pronounced manner, into a tubular or practically tubular transverse configuration, with the longitudinal edges raised up and coming side by side or practically side by side with each other, as illustrated in FIG. 2.

The two longitudinal edges of the belt 1 are raised up in a similar way in order to form a structure that is symmetrical with respect to the vertical central plane thereof.

With the framework of such a tubular transverse configuration, the central axis is maintained in the vertical plane of the tube and the longitudinal reinforcing members 6 are then positioned on the horizontal diameter P of the cross section of the tube (see FIG. 2), which permits to maximally restrict the internal stresses of the carrier structure, in particular when this structure moves along non-rectilinear paths (corners or curves), in a plane that is perpendicular to the axes of the end rolls of the equipped conveying structure.

FIG. 2 shows the shaping into a practically tubular transverse configuration of the carrier belt 1, maintained by means of adequately arranged longitudinal guiding members 7.

The longitudinal guiding members 7 may consist in round-section metal wire (as illustrated in FIG. 2); they may be rails or sections in a metal or plastic material, for example PEHD.

It can be noticed herein that some of the guiding members 7 come and rest on the sides of the single-piece studs 15, to avoid the lateral (or rotational) displacement of the endless belt 1 when the latter moves.

The tubular transverse configuration can be implemented for example within the framework of elevator conveyors to optimize the transportation of products or material, in particular at the ascending section(s).

Figure 3:
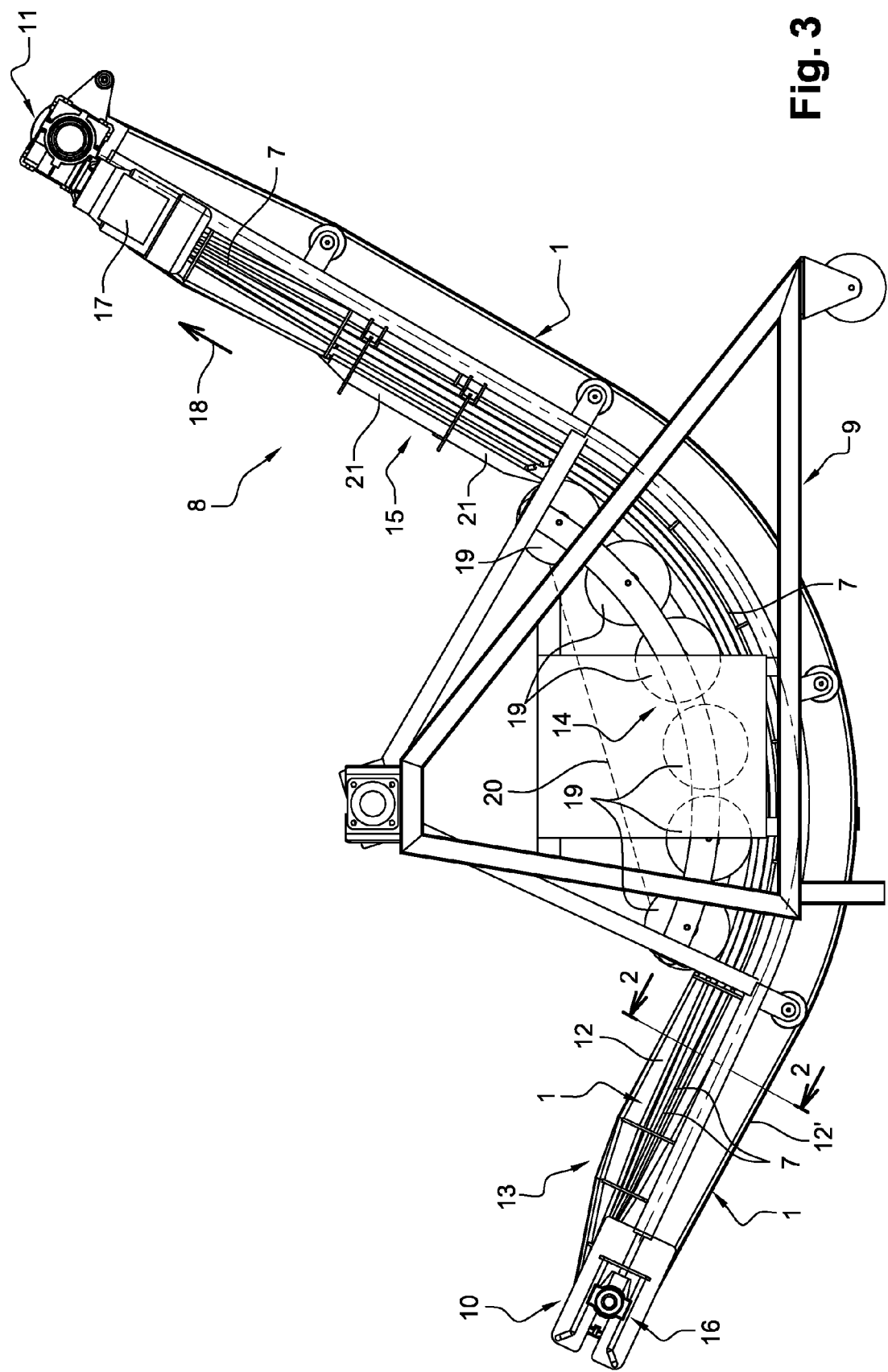
FIG. 3 is a side view of a conveying installation, in the form of an elevator conveyor, implementing the carrier belt illustrated in FIGS. 1 and 2.

An elevator conveyor 8 of this type is shown in FIG. 3.

The elevator conveyor 8 comprises a frame 9 equipped with the endless carrier belt 1 that is rolled in a flat configuration around—an upstream lower transmission structure 10 and—a downstream upper transmission structure 11, both in the form of end rolls.

The endless belt 1 comprises—an upper strand 12, the upper face of which forms the product carrier surface, and—a lower strand 12', forming a return strand.

The upper strand 12 of the endless belt 1 is guided by the frame 2 so as to define, from the upstream roll 11, a rectilinear loading section 13 for the products that are carried, followed by a concave curved section 14, itself followed by a rectilinear ascending section 15 that leads to the upstream end roll 11.

The elevator conveyor 8 comprises conventional means 16 for tensioning or loosening the endless belt 1, which are herein provided at the upstream roll 10.

The downstream roll 11 is associated with a motor 17 in order to be rotated to drive the endless belt 1 in the direction of the directional arrow 18.

At the end rolls 10 and 11, the endless belt 1 has a flat or substantially flat transverse configuration, as shown in FIG. 1. On the other hand, between the upstream 10 and downstream 11 ends, the elevator conveyor 8 is structured so as to shape the endless belt 1 into a curved configuration, and more particularly a tubular configuration, at least over a portion of the ascending section 15 (and preferably over a portion of at least a curved section 14 and over most of the ascending section 15), therefore taking advantage of its characteristic of transversal flexibility, so as to optimize the ascending transportation of the products.

At the loading section 13, the endless belt 1 has a flat configuration, adapted to permit the products to be dropped off, for example through a hopper (not shown).

The loading section 13 can be structured in a descending slope, as illustrated in FIG. 3; in alternative embodiments, the corresponding descending slope may be less steep. The loading section 13 may also run horizontally or following a slight ascending slope, in particular, as a function of the nature of the products to be carried.

The shaping of the endless belt 1 into a curved configuration, with the longitudinal edges raised up toward each other, is initiated at the loading section 13, or just after the latter, by means of the above-mentioned longitudinal guiding members 7 that come and rest against the lower face 4 of said endless belt 1 (FIG. 2).

In the illustrated embodiment, the tubular configuration of the endless belt 1 is obtained approximately at the end of the loading section 13, i.e. approximately at the entrance of the curved section 14, and it runs as high as possible over the ascending section 15, i.e. just before the downstream end 11. The belt section illustrated in FIG. 2 may correspond to the section 2-2 of FIG. 3.

Upstream of the entire tubular configuration, the guiding members 7 progressively deform the endless belt 1 to pass from the flat transverse configuration (at the end roll 10) to the tubular configuration (while keeping an adapted space for the product loading).

Downstream of the entire tubular configuration, the guiding members 7 progressively deform the endless belt 1 to pass from said tubular configuration to a flat configuration (at the end roll 11).

The tubular conveying configuration can be obtained by the guiding members 7 alone.

However, the guiding members 7 are preferably associated with complementary means (schematically shown and designated at 19, 20, 21 in FIG. 2), adapted to maintain the endless-belt longitudinal edges side by side or practically side by side with each other, so as to create or to reinforce the tightness at the upper generating line of the obtained tube.

At the curved section 14 of the elevator conveyor 8, said complementary means herein comprise a set of rollers 19 mounted in free rotation and juxtaposed along a circular-arc line, above the conveying tube 1. The rollers 19 have an active surface with a concave circular-arc cross-section complementary to the tubular cross-section of the belt; they are distributed one after the other so as to come into contact with the tubular part of the endless belt 1, at the junction line of the sides thereof located side by side or practically side by side with each other.

To obtain a continuous contact and an optimized tightness, the juxtaposition of the rollers 19 is advantageously associated with a flexible endless belt 20 that surrounds them. The upper (not active) strand of the endless belt 20 appears in FIG. 3. The lower strand thereof rests continuously against the conveying tube 1 to provide the desired tightness. It moves at the same speed or substantially the same speed as the conveying tube 1, being driven by the latter.

At the rectilinear ascending section 15 of the elevator conveyor 8, the complementary means for maintaining the endless-belt longitudinal edges side by side or practically side by side with each other consist in fixed rest pads 21, the active surface of which has a concave circular-arc cross-section complementary to the upper section of the conveying tube.

In the areas of presence of the complementary means 19-20; 21 that rest against the upper part of the conveying tube 1, the longitudinal guiding members 7 can be provided so as to only guide the lower part and possibly the side parts of said conveying tube 1.

At the curved section 14 of the elevator conveyor, means in the form of lateral rest rails and/or in the form of lower traction member(s) may also be provided, adapted to avoid the collapsing of the conveyor tube 1.

This collapsing may also be restricted or avoided by adequately choosing the nature of the endless belt 1 and the thickness thereof.

With the above-mentioned structure of elevator conveyor 8, having the endless carrier belt 1 driven by the motorized drum 11, the products can be dropped off onto the loading section 13. They are then progressively guided into the tubular portion of the curved section 14; they accumulate in the upstream portion of the ascending section 15 and are carried upward up to the downstream portion of the conveyor, under the effect of the displacement of the belt 1, the tubular conformation thereof and the thrust of the upstream products.

Arriving at the downstream transmission structure 11, the products are taken up by any adapted structure, such as a receiving hopper, a carrier conveyor, an output chute, or the like.

Such an elevator conveyor structure proves to be very simple and particularly efficient; the slope of the ascending section 15 may reach 60, 80 or even 100%, which provides it with very advantageous compactness characteristics. The endless belt 1 having a smooth upper surface 3 can be easily cleaned, for example by scraping means arranged at the level of a flat configuration portion (for example, at the ends or at the return lower strand 12' thereof).

Furthermore, the particular position of the reinforcing members 6 avoids any internal stress in the endless belt structure configured into a tube, in particular at the curved section 14, when the vertical central plane of the tube is kept on the central axis of the belt.

This type of elevator conveyor may be efficiently used for upward transferring loose products coming in portions, pieces, tabs, grains, powder . . . It finds application in particular for food products such as cut meat, grated cheese or vegetables, entire or cut fishes.

The invention claimed is:

1. An endless carrier belt for a conveyor device, said endless carrier belt (1) comprising:
   a flat body of flexible material and in a flat form,
   the flat body (2) having a width (L), a longitudinal central plane (X) and a thickness (e), a bottom face (3) intended to receive a product to be carried, and a lower face (4),
   a plurality of longitudinal reinforcing members (6) integrated into the thickness (e) of said flat body (2), the reinforcing members (6) adapted to restrict the longitudinal extension possibilities of the flat body (2),
   wherein said reinforcing members (6) are positioned only in two areas of the width (L) of said flat body (2), the two areas located at ¼ or approximately ¼ of said width (L), on either side of said central plane (X),
   single-piece studs (5) provided on the lower face (4),
   two end transmission structures (10 and 11), one of which is motorized, and on both of which said endless carrier belt (1) is rolled in a flat configuration, at least said motorized transmission structure (11) comprising driving elements that cooperate with said single-piece studs (5) provided on the lower face (4) of the endless carrier belt (1), to drive the latter, and
   means (19-20; 21) for shaping the upper strand of said endless carrier belt (1) into a tubular or substantially tubular transverse configuration, with the longitudinal edges raised up and coming side by side or practically side by side with each other, the two longitudinal reinforcing members (6) or groups of longitudinal reinforcing members (6) of said endless carrier belt (1) being then positioned on the horizontal diameter (P) of the cross section of said tubular structure (1) obtained, or substantially on this horizontal diameter,
   wherein the means for shaping the endless carrier belt into a tubular or substantially tubular transverse configuration are comprised, at least in part, of longitudinal guiding members (7) against which rests the lower face (4) of the upper strand of said endless carrier belt (1), said guiding members (7) cooperating with the driving studs (5) provided on the lower face (4) of said endless carrier belt (1), to avoid the lateral displacement of said endless belt (1), and
   wherein the longitudinal reinforcing members (6) are embedded in the mass of the flat body (2), each at the neutral fiber of said flat body (2), approximately in the middle of the thickness (e).

2. The endless carrier belt according to claim 1, comprising two groups of the plurality of parallel longitudinal reinforcing members (6), each group of longitudinal reinforcing members (6) positioned in the two areas of the width (L) of the flat body (2) located at ¼ or approximately ¼ of said width (L) on either side of said central plane (X).

3. The endless carrier belt according to claim 2, wherein each group of longitudinal reinforcing members (6) comprise between two and six reinforcing members (6).

4. The endless carrier belt according to claim 1, wherein the longitudinal reinforcing members (6) are embedded in the mass of the flat body (2), each at the neutral fiber of said flat body (2) approximately in the middle of the thickness (e).

5. The endless carrier belt according to claim 1, wherein said protruding single-piece studs (5) are regularly distributed over the lower face (4) of the flat body (2) and arranged in parallel rows of two couples, the studs (5) of each couple being separated from each other by an area (A) of the flat body (2) centered on the ¼ of its width (L) on either side of the central plane (X).

6. The endless carrier belt according to claim 5, wherein the reinforcing members or the groups of reinforcing members (6) are positioned in the area (A) of the flat body (2) and centered on said area (A).

7. The endless carrier belt according to claim 2, wherein said protruding single-piece studs (5) are regularly distributed over the lower face (4) of the flat body (2) and arranged in parallel rows of two couples, the studs (5) of each couple being separated from each other by an area (A) of the flat body (2) centered on the ¼ of its width (L) on either side of the central plane (X).

8. The endless carrier belt according to claim 3, wherein said protruding single-piece studs (5) are regularly distributed over the lower face (4) of the flat body (2) and arranged in parallel rows of two couples, the studs (5) of each couple being separated from each other by an area (A) of the flat body (2) centered on the ¼ of its width (L) on either side of the central plane (X).

9. The endless carrier belt according to claim 4, wherein said protruding single-piece studs (5) are regularly distributed over the lower face (4) of the flat body (2) and arranged in parallel rows of two couples, the studs (5) of each couple being separated from each other by an area (A) of the flat body (2) centered on the ¼ of its width (L) on either side of the central plane (X).

\* \* \* \* \*